United States Patent
Saeki (10) Patent No.: US 11,777,746 B2
(45) Date of Patent: Oct. 3, 2023

(54) MUTUAL AUTHENTICATION SYSTEM AND MUTUAL AUTHENTICATION METHOD

(71) Applicant: NIDEC SANKYO CORPORATION, Nagano (JP)

(72) Inventor: Kazuto Saeki, Nagano (JP)

(73) Assignee: NIDEC SANKYO CORPORATION, Nagano (JP)

(*) Notice: Subject to any disclaimer, the term of this patent is extended or adjusted under 35 U.S.C. 154(b) by 507 days.

(21) Appl. No.: 17/256,231

(22) PCT Filed: Jun. 6, 2019

(86) PCT No.: PCT/JP2019/022534
§ 371 (c)(1),
(2) Date: Dec. 28, 2020

(87) PCT Pub. No.: WO2020/003958
PCT Pub. Date: Jan. 2, 2020

(65) Prior Publication Data
US 2021/0266187 A1 Aug. 26, 2021

(30) Foreign Application Priority Data
Jun. 29, 2018 (JP) ................. 2018-124592

(51) Int. Cl.
*H04L 9/32* (2006.01)
*H04L 9/08* (2006.01)

(52) U.S. Cl.
CPC .......... *H04L 9/3273* (2013.01); *H04L 9/0869* (2013.01); *H04L 9/0894* (2013.01)

(58) Field of Classification Search
CPC .... H04L 9/3273; H04L 9/0869; H04L 9/0894
See application file for complete search history.

(56) References Cited

U.S. PATENT DOCUMENTS

2007/0106894 A1* 5/2007 Zhang ................ H04L 63/0428
713/170
2013/0133035 A1 5/2013 Baba
(Continued)

FOREIGN PATENT DOCUMENTS

JP 2007173911 7/2007
JP 2008271069 11/2008
(Continued)

OTHER PUBLICATIONS

"International Search Report (Form PCT/ISA/210) of PCT/JP2019/022534", dated Aug. 6, 2019, with English translation thereof, pp. 1-3.

*Primary Examiner* — Hee K Song
(74) *Attorney, Agent, or Firm* — JCIPRNET (57) ABSTRACT

To provide a mutual authentication system which is not required to erase master key when a slave device is replaced. The storage part stores a temporary key which is key data used temporarily and a master key which is key data used for authentication. The storage part stores the temporary key. The key confirmation unit inquires whether the slave device stores the master key. The key confirmation response unit confirms whether the master key has already been stored in the storage part for an inquiry from the master device and responds. The key introduction unit encrypts the master key by using the temporary key and transmits to the slave device. The key storage unit decrypts the encrypted master key by using the temporary key and stores in the storage part. The main authentication unit and the sub-authentication unit authenticate with each other by using the master key.

9 Claims, 6 Drawing Sheets

(56) References Cited

U.S. PATENT DOCUMENTS

2017/0111173 A1* 4/2017 Sugitani ................ H04W 12/04
2017/0324558 A1 11/2017 Takemori et al.

FOREIGN PATENT DOCUMENTS

| JP | 2013109554 | 6/2013 |
| JP | 2014081931 | 5/2014 |
| JP | 2016116216 | 6/2016 |

* cited by examiner

MUTUAL AUTHENTICATION SYSTEM AND MUTUAL AUTHENTICATION METHOD

CROSS-REFERENCE TO RELATED APPLICATION

This application is a 371 application of the International PCT application serial no. PCT/JP2019/022534, filed on Jun. 6, 2019, which claims the priority benefit of Japan Patent Application No. 2018-124592, filed on Jun. 29, 2018. The entirety of each of the above-mentioned patent applications is hereby incorporated by reference herein and made a part of this specification.

TECHNICAL FIELD

The present invention relates to a mutual authentication system and a mutual authentication method, and especially, the present invention relates to a mutual authentication system and a mutual authentication method capable of mutually authenticating between a master device and a slave device.

BACKGROUND ART

Conventionally, a card reader has been known which includes a main body side circuit board (master device) and a head side circuit board (slave device).

An example of such a card reader is described in Patent Literature 1. A master device of the card reader includes a CPU (main control part) which controls a magnetic head. A slave device is structured as an encryption magnetic head which is integrally formed. The encryption magnetic head includes a magnetic head, a demodulation IC and a CPU (sub-control part) for performing encryption and decryption. The sub-control part stores a master key which is key data for encryption. Therefore, the slave device encrypts demodulated magnetic data and safely transmits to a main control part and a host apparatus.

On the other hand, a mutual authentication system has been known in which mutual authentication of encryption is performed between a plurality of devices. For example, a system performing such mutual authentication is described in Patent Literature 2.

CITATION LIST

Patent Literature

PTL 1: Japanese Patent Laid-Open No. 2014-81931
PTL 2: Japanese Patent Laid-Open No. 2013-109554

SUMMARY OF THE INVENTION

Problems to be Solved by the Invention

Among typical card readers such as the card reader described in Patent Literature 1, a card reader has existed in which mutual authentication is performed between a master device and a slave device.

In such a card reader, when a slave device is to be replaced (at a time of replacement), a master key is required to be erased once due to the requirement for safety (security). However, erasing of the master key itself has concern on security.

In view of the problem described above, the present invention provides a mutual authentication system which is capable of eliminating the above-mentioned problem and safely exchanging a slave device even when a master key is not erased.

Means to Solve the Problems

A mutual authentication system in accordance with the present invention is a mutual authentication system including a master device and a slave device which are authenticated with each other. The master device includes a storage part which stores a temporary key that is key data temporarily used and a master key that is key data used for authentication, a key confirmation unit configured to inquire whether the slave device stores the master key, a key introduction unit configured so that, in response to the inquiry of the key confirmation unit, when the slave device does not store the master key, the key introduction unit encrypts the master key by using the temporary key and transmits to the slave device, and a main authentication unit configured to mutually authenticate with the slave device by using the master key transmitted from the key introduction unit. The slave device includes a storage part which stores the temporary key, a key confirmation response unit configured to confirm whether the master key has already been stored in the storage part for the inquiry from the master device and respond, a key storage unit configured to decrypt the master key transmitted from the master device by using the temporary key for a response of the key confirmation response unit and store in the storage part, and a sub-authentication unit configured to mutually authenticate with the master device by using the master key which is stored in the storage part by the key storage unit.

According to this configuration, the slave device can be safely replaced even when the master key is not erased.

In the mutual authentication system in accordance with the present invention, the master device further includes a key generation unit configured to generate the master key by using a random number when initially started and store it in the storage part.

According to this configuration, when the master device is initially started at a time of shipment from a factory or the like, the key data which are device unique can be generated safely.

In the mutual authentication system in accordance with the present invention, the key confirmation unit inquires whether the slave device stores the master key at a specific timing.

According to this configuration, it can be detected that an illegal head or the like has been attached In the mutual authentication system in accordance with the present invention, mutual authentication by the main authentication unit and the sub-authentication unit use a symmetric key encryption system.

According to this configuration, processing speed relating to mutual authentication can be improved and mutual authentication can be performed in a device having an inexpensive control part.

A mutual authentication method in accordance with the present invention is a mutual authentication method executed by a mutual authentication system including a master device and a slave device which are authenticated with each other, the master device includes a storage part which stores a temporary key that is key data temporarily used and a master key that is key data used for authentication, and the slave device includes a storage part storing the temporary key. The mutual authentication method includes inquiring by the master device whether the slave device stores the master key, confirming by the slave device whether the master key has already been stored in the storage part and responding for an inquiry from the master device, encrypting by the master device the master key by using the temporary key in a case that, as a response to the inquiry, the slave device does not store the master key, and transmitting to the slave device, decrypting by the slave device the master key transmitted from the master device for the response by using the temporary key and storing in the storage part, and mutually authenticating between the master device and the slave device by using the master key.

According to this configuration, the slave device can be safely replaced even when the master key is not erased.

Effects of the Invention

According to the present invention, a mutual authentication system can be provided which is configured so that, without changing a master key of a master device, a slave device after replacement is inquired whether the master key is stored and, when the master key is not stored, the master key is encrypted by using a temporary key and transmitted to the slave device and stored in the slave device and thereby, the slave device can be safely replaced even when the master key is not erased.

DESCRIPTION OF EMBODIMENTS

Embodiments

A structure of a card reader 1 which is a mutual authentication system in accordance with an embodiment of the present invention will be described below with reference to FIG. 1.

The card reader 1 is, in this embodiment, a card reader which is mounted on an ATM (Automated Teller Machine) provided with a card issuing function, a terminal of a kiosk, a ticket issue system in a transportation system, a point card issue system in a convenience store or the like, a member card issue system in a retail store, a card issue and payment system for a game machine, an entrance/exit management system, or the like (hereinafter, referred to as merely "ATM or the like").

Specifically, the card reader 1 is a device which is capable of reading (read) from or writing (write) to a card medium 2, which is a contact type or non-contact type IC card and/or a magnetic card provided with a magnetic stripe.

A detailed structure of the card reader 1 will be described below.

In addition, the card reader 1 is connected with a host apparatus which is a main body apparatus for realizing respective functions of an ATM or the like. The host apparatus includes, for example, an information processing device such as a PC (Personal Computer) for controlling respective units, a tablet terminal or a portable telephone and executes applications (Application Program, not shown) for realizing functions of an ATM or the like. In addition, the host apparatus is connected with peripheral devices such as a printer structured to perform printing and marking on a surface of a card medium 2, a display such as an LCD panel or an organic EL panel, a touch panel and buttons.

More specifically, the card reader 1 includes a master device 10 and a slave device 20 which authenticate with each other.

The master device 10 is a main processing device which performs general processing as the card reader 1 and controls writing and reading of information to a card medium 2. The master device 10 is, for example, configured as various circuits on a main (master) circuit board which controls the entire card reader 1. In this embodiment, the master device 10 controls the slave device 20 connected with the master device 10 through communication.

The slave device 20 is an encryption magnetic head (Encrypting Head or E-Head) or the like. The encryption magnetic head encrypts demodulated magnetic data and safely transmits to a control part 11 and the host apparatus. Therefore, the slave device 20 realizes functions encrypting or decrypting information read by the magnetic head 23 or encrypting or decrypting information to cause the magnetic head 23 to record to a card medium 2. Accordingly, the slave device 20 is, for example, provided with data encryption function, decryption function and the like for preventing a swindle of data such as an ID, a personal identification number and a password which are stored in the card medium 2. In addition, the slave device 20 in this embodiment is configured so that, for security, unless a specific processing procedure is observed for control, the processing is not executed.

When further described in detail, the master device 10 is provided with the control part 11 and a storage part 12. The slave device 20 is provided with a control part 21, a storage part 22 and the magnetic head 23.

The control part 11 is a control calculation means for performing processing of the entire card reader 1 which includes a CPU (Central Processing Unit), an MPU (Micro Processing Unit), a GPU (Graphics Processing Unit), a DSP (Digital Signal Processor), an ASIC (Application Specific Integrated Circuit), or the like.

The storage part 12 is a storage medium such as a RAM (Random Access Memory) and a ROM (Read Only Memory). The RAM is, for example, a volatile recording medium such as an SRAM (Static RAM) or a DRAM (Dynamic RAM), and a nonvolatile recording medium such as an FeRAM (Ferroelectric Random Access Memory) or an MRAM (Magnetoresistive Random Access Memory). The ROM is, for example, a nonvolatile recording medium such as an EEPROM (Electrically Erasable and Programmable ROM) or a Flash Memory.

The storage part 12 stores a control program (embedded software) for the control part 11 which is mounted on the master device 10. The control program is incorporated with processing such as monitoring of a detection sensor for a card medium 2, reading and writing for the card medium 2, and control of the slave device 20. In this embodiment, the storage part 12 is, for example, configured as an built-in memory in the control part 11.

The control part 21 is a control calculation means including a CPU, MPU, GPU, DSP, ASIC or the like which performs state monitoring and control of the slave device 20. The control part 21 executes encryption processing of information and processing such as authentication utilizing encryption. Specifically, for example, the control part 21 may include an accelerator which executes a control program performing various kinds of encryption and decryption by a method such as AES (Advanced Encryption Standard) and exclusively executes calculation.

The storage part 22 is a non-transitory storage medium such as a RAM and a ROM. The storage part 22 includes volatile and nonvolatile recording media similarly to the storage part 12.

The storage part 22 stores a control program (embedded software) for the control part 21 which is mounted on the slave device 20. In this embodiment, the storage part 22 is, for example, configured as an built-in memory in the control part 21.

The magnetic head 23 includes a magnetic head performing read (reading) and write (writing) to a card medium 2, an electromagnetic induction coil, terminals, and the like and a circuit therefor and the like. In addition, the magnetic head 23 may also include a detection sensor for a card medium 2, a drive mechanism and the like.

Next, functional configurations of the card reader 1 will be described below.

Figure 1:
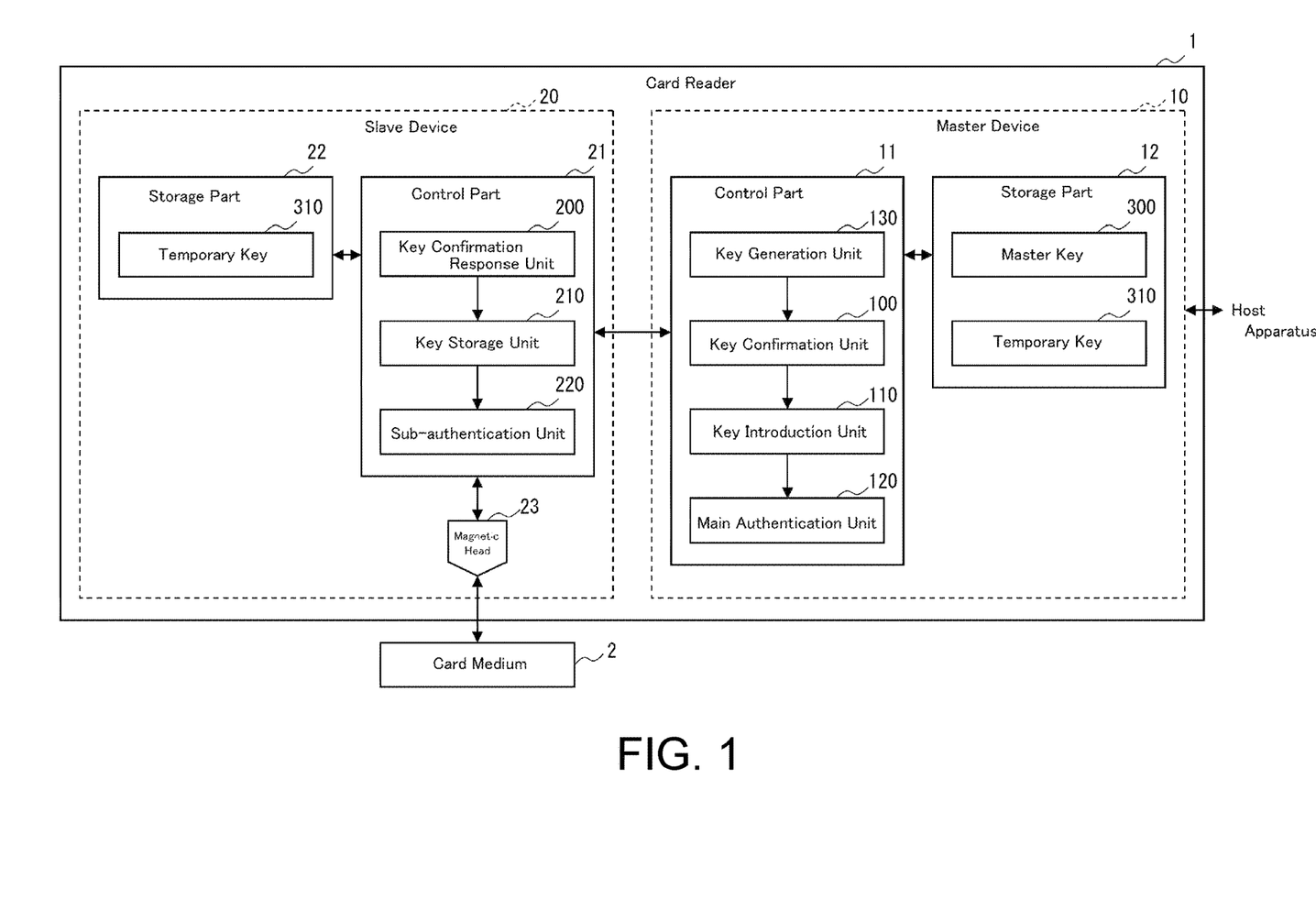
FIG. 1 is a system configuration diagram showing a mutual authentication system in accordance with an embodiment of the present invention.

FIG. 1 shows a state that, after the master device 10 is initially started, the slave device 20 is to be replaced (at a time of replacement) due to wearing, failure, a change of the standard, or the like. In a state of the replacement, the slave device 20 is, for example, provided as a repair component (new article) which is shipped from a factory.

The control part 11 of the master device 10 is, as functional configuration units, provided with a key confirmation unit 100, a key introduction unit 110, a main authentication unit 120 and a key generation unit 130.

The storage part 12 stores a master key 300 and a temporary key 310.

The control part 21 of the slave device 20 is, as functional configuration units, provided with a key confirmation response unit 200, a key storage unit 210, and a sub-authentication unit 220.

The storage part 22 stores the temporary key 310.

The key confirmation unit 100 inquires whether the slave device 20 stores the master key 300 which is the same as that stored in the storage part 12. In this case, the key confirmation unit 100 inquires whether the slave device 20 stores the master key 300 at a specific timing. The specific timing is, for example, a timing when the power source is turned on.

When the slave device 20 does not store the master key 300 in response to the inquiry from the key confirmation unit 100, the key introduction unit 110 encrypts the master key 300 by using the temporary key 310 to transmit it to the slave device 20. As a result, the key introduction unit 110 is capable of recognizing replacement or the like of the slave device 20 and introducing the master key 300 generated before replacement into the slave device 20 without erasing the master key 300.

The main authentication unit 120 performs mutual authentication with the slave device 20 by using the master key 300 transmitted from the key introduction unit 110. In this embodiment, the main authentication unit 120 performs mutual authentication with the sub-authentication unit 220.

In this embodiment, the mutual authentication is performed by a symmetric key encryption method using the master key 300.

The key generation unit 130 generates the master key 300 by using a random number when the master device 10 is initially started and the master key 300 is stored in a nonvolatile recording medium of the storage part 12. The initial start is, for example, performed during inspection in factory shipment, at an initially applied time of power supply when installed in a customer environment (hereinafter, referred to as "when shipped from a factory, or the like").

The key confirmation response unit 200 confirms, for an inquiry from the master device 10, whether or not the master key 300 has already been stored in the storage part 22 and responds.

The key storage unit 210 decrypts the master key 300 transmitted from the master device 10 by using the temporary key 310 for the response of the key confirmation response unit 200 and stores in the storage part 22.

The sub-authentication unit 220 performs mutual authentication with the master device 10 by using the master key 300 which is stored in the storage part 22 by the key storage unit 210. In this embodiment, the sub-authentication unit 220 performs mutual authentication with the main authentication unit 120 by a symmetric key encryption system which uses the master key 300.

The master key 300 is key data which are used for authentication. In this embodiment, the master key 300 is, for example, key data of a symmetric key. The symmetric key is capable of using a random number value which is generated according to the standard of ANSI X9.17 or the like so as to individually provide for each card reader 1 (hereinafter, referred to as a "device unique").

The temporary key 310 is key data which are used temporarily. The temporary key 310 is, for example, a symmetric key and is key data which are common for each model. The temporary key 310 is, for example, also key data of the symmetric key.

In this embodiment, the control part 11 executes the control program stored in the storage part 12 to perform functions as the key confirmation unit 100, the key introduction unit 110, the main authentication unit 120 and the key generation unit 130.

The control part 21 executes the control program stored in the storage part 22 to perform functions as the key confirmation response unit 200, the key storage unit 210, and the sub-authentication unit 220.

Further, the respective units of the card reader 1 described above are hardware resources executing information processing method in the present invention.

In accordance with an embodiment of the present invention, a part or an arbitrary combination of the functional configuration units described above may be configured in a hardware such as an IC, programmable logic or FPGA (Field-Programmable Gate Array).

[Mutual Authentication Processing in Card Reader]

Figure 2:
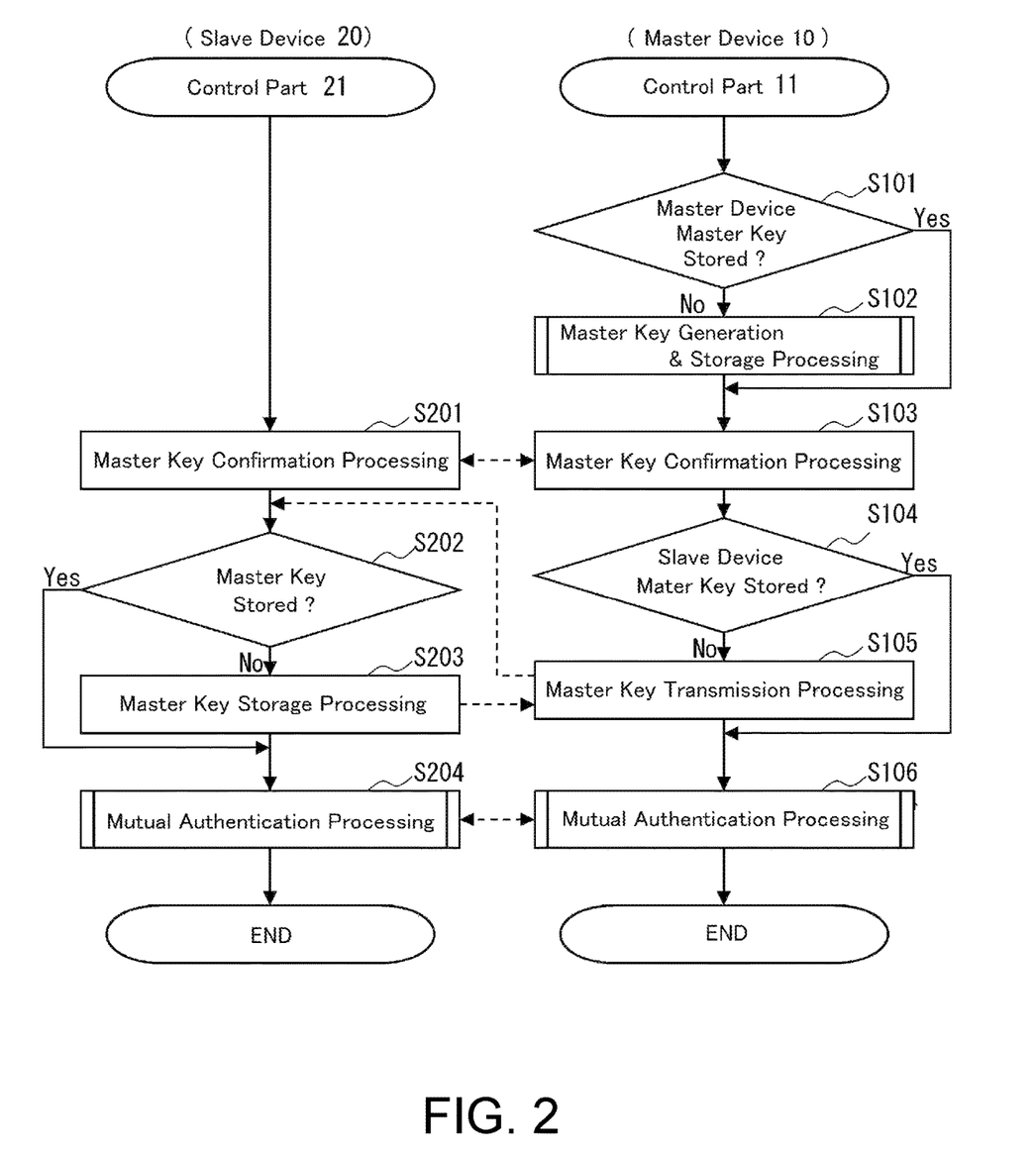
FIG. 2 is a flow chart showing a mutual authentication processing in accordance with an embodiment of the present invention.
Figure 3:
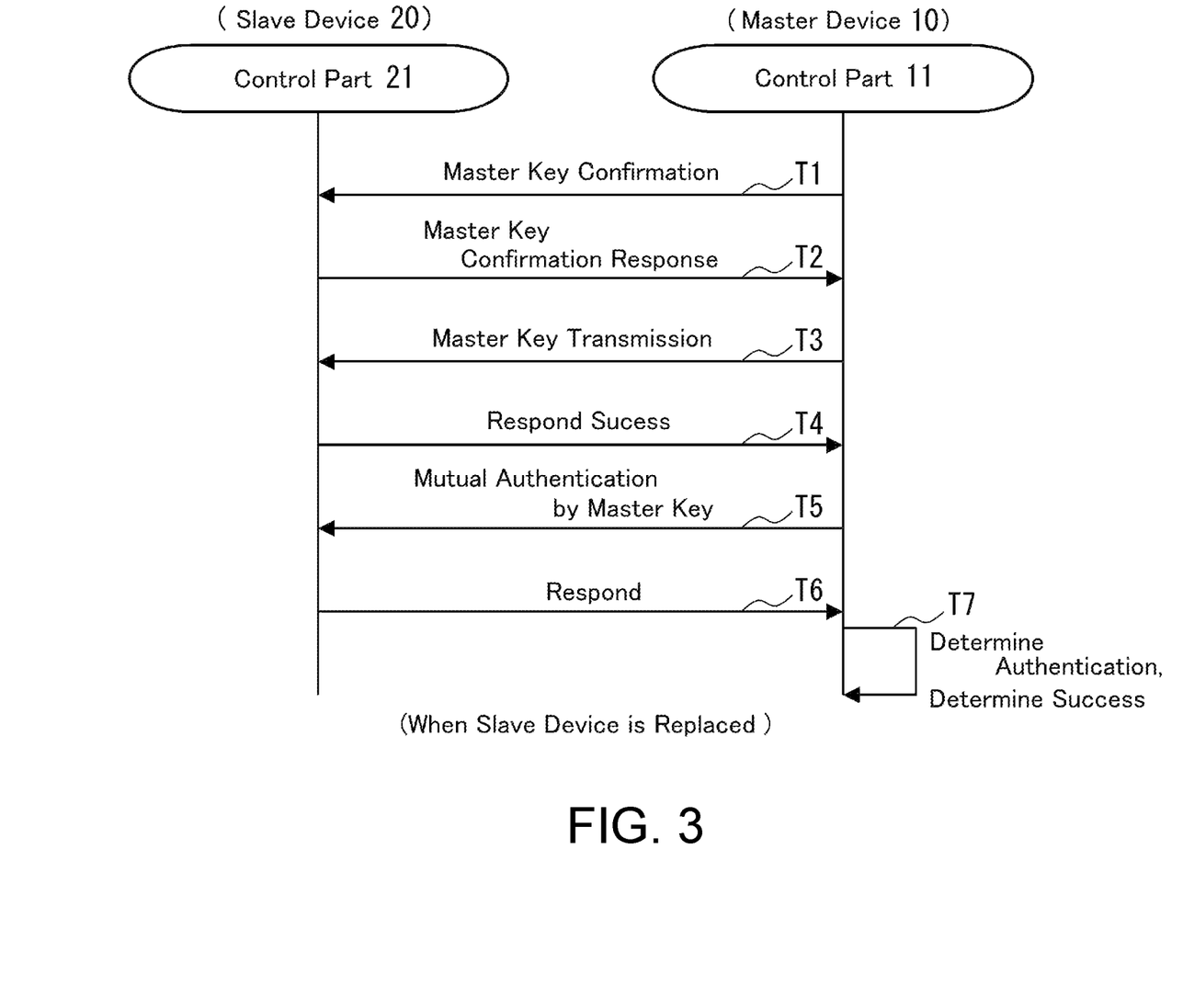
FIG. 3 is a sequence chart showing a mutual authentication processing shown in FIG. 2 when a slave device is replaced.

Next, mutual authentication processing in accordance with an embodiment of the present invention which is executed in the card reader 1 will be described below with reference to FIG. 2 and FIG. 3.

In a mutual authentication processing in this embodiment, the master device 10 inquires whether the slave device 20 stores the master key 300. In response to the inquiry, the slave device 20 confirms whether the master key 300 has already been stored in the storage part 22 and responds. When the response for the inquiry is that the slave device 20 does not store the master key 300, the master device 10 encrypts the master key 300 by using the temporary key 310 and transmits to the slave device 20. The slave device 20 decrypts the master key 300 transmitted from the master device 10 for the response by using the temporary key 310 and stores in the storage part 22. Then, the master device 10 and the slave device 20 are authenticated with each other by using the master key 300.

The mutual authentication processing in this embodiment is executed by using the hardware resources in cooperation with the respective units so that the control part 11 of the master device 10 and the control part 21 of the slave device 20 mainly execute the control programs respectively stored in the storage part 12 and the storage part 22.

Details of the mutual authentication processing will be described below for each step with reference to the flow chart shown in FIG. 2.

(Step S101)

First, processing of the master device 10 will be described.

The key generation unit 130 confirms whether or not the master key 300 is stored in the storage part 12 at start-up or the like.

The key generation unit 130 determines "Yes" in a case that the master key 300 has already been stored in the storage part 12. The key generation unit 130 determines "No" in a case that, for example, the master key 300 is not stored yet in the storage part 12 when the master device 10 is initially started at a time of shipment from a factory or the like.

In the case of "Yes", the key generation unit 130 advances the processing to the step S103.

In the case of "No", the key generation unit 130 advances the processing to the step S102.

(Step S102)

In a case that the master key 300 is not stored in the storage part 12, the key generation unit 130 performs master key generation and storage processing.

In this embodiment, at initial start-up, the storage part 12 stores only the temporary key 310 as key data.

Therefore, at the time of initial starting, the key generation unit 130 generates a master key 300 by using a random number and stores in a nonvolatile recording medium of the storage part 12. The master key 300 is generated in the key generation unit 130 by, for example, using a random number value which is generated according to the standard of ANSI X9.17 or the like.

In other words, in this embodiment, at initial start-up, a master key 300 which is device unique is generated. The initial start-up is, for example, performed during an inspection at the time of shipment from a factory or the like and thus, the initial start-up is performed in a place having high security.

FIG. 1 shows a configuration of the storage part 12 in this state.

(Steps S103 and S201)

In these steps, the key confirmation unit 100 of the master device 10 and the key confirmation response unit 200 of the slave device 20 perform master key confirmation processing.

First, the key confirmation unit 100 inquires whether the slave device 20 stores the master key 300 whenever a power source is turned on. In this case, the key confirmation unit 100 transmits a confirmation command and the like to the slave device 20 (timing T1).

On the other hand, in response to the inquiry from the master device 10, the key confirmation response unit 200 confirms whether the master key 300 has already been stored in the storage part 22 and responds (timing T2).

As shown in FIG. 1, when the slave device 20 is replaced, only the temporary key 310 is stored and the master key 300 is not stored. In this case, the key confirmation response unit 200 responds that the master key 300 is not stored yet.

However, for example, in a case that the power source is normally turned on, in a case that the master key 300 has already been received and stored or, in a case that a used slave device 20 is utilized, the master key 300 may have already been stored in the storage part 22. When the master key 300 has already been stored in the storage part 22 as described above, the key confirmation response unit 200 responds the result.

(Step S104)

Next, the key introduction unit 110 of the master device 10 determines whether or not the master key 300 is stored in the slave device 20.

The key introduction unit 110 determines "Yes" in a case that the key introduction unit 110 acquires the response from the slave device 20 that the master key 300 has already been stored. The key introduction unit 110 determines "No" in a case that the key introduction unit 110 acquires the response that the master key 300 is not stored yet.

In the case of "Yes", the key introduction unit 110 advances the processing to the step S106.

In the case of "No", the key introduction unit 110 advances the processing to the step S105.

(Step S105)

In a case that the master key 300 is not stored in slave device 20, the key introduction unit 110 performs master key transmission processing.

The key introduction unit 110 encrypts the master key 300 by using the temporary key 310 and transmits to the slave device 20. Specifically, for example, the key introduction unit 110 reads out the master key 300 stored in the storage part 12 and encrypts the master key 300 with the temporary key 310 as key data by using the system such as AES. Then, the key introduction unit 110 transmits the encrypted master key 300 to the slave device 20 by using a key introduction command (timing T3).

(Step S202)

Next, processing of the slave device 20 will be described below.

When the key confirmation response unit 200 receives the key introduction command, the processing is branched according to a determination result whether or not the master key 300 is stored in the storage part 22. In the determination, in a case that the master key 300 is stored in the storage part 22, the key confirmation response unit 200 determines "Yes". The key confirmation response unit 200 determines "No" in a case that the master key 300 is not stored in the storage part 22.

In the case of "Yes", the key confirmation response unit 200 advances the processing to the step S204.

In the case of "No", the key confirmation response unit 200 advances the processing to the step S203.

(Step S203)

In a case that the master key 300 is not stored in the storage part 22, the key storage unit 210 performs master key storage processing.

The key storage unit 210 receives encrypted master key 300, which is transmitted from the master device 10 in response to the key confirmation response unit 200, from the master device 10.

The key storage unit 210 decrypts the encrypted master key 300 which is received by using the temporary key 310 and stores in the storage part 22.

In a case that the storage has succeeded, the key storage unit 210 responds the success to the master device 10 (timing T4).

(Steps S106 and S204)

In these steps, the main authentication unit 120 of the master device 10 and the sub-authentication unit 220 of the slave device 20 perform mutual authentication processing.

In this processing, the main authentication unit 120 of the master device 10 and the sub-authentication unit 220 of the slave device 20 are authenticated with each other by using the master key 300. Specifically, the main authentication unit 120 performs mutual authentication with the slave device 20 by using the master key 300 stored in the storage part 12. Further, the sub-authentication unit 220 performs mutual authentication with the master device 10 by using the master key 300 stored in the storage part 22 by the key storage unit 210 (timings T5 and T6).

The mutual authentication is, for example, capable of performing by the system as described in Patent Literature 2. More specifically, for example, the main authentication unit 120 and the sub-authentication unit 220 respectively prepare random number values to encrypt by using the master key 300 and, after these values are mutually transmitted and received, they confirm by calculating total values.

In this embodiment, the main authentication unit 120 confirms a content of a response from the slave device and determines whether the mutual authentication has succeeded or failed (timing T7). In the main authentication unit 120, in a case that the authentication has succeeded, the result is stored in the recording medium of the storage part 12.

In this manner, the mutual authentication processing in accordance with an embodiment of the present invention is ended.

Principal Effects in this Embodiment

According to this embodiment, following effects can be attained by configuring as described above.

As described above, in a conventional card reader as described in Patent Literature 1, when a slave device is replaced, a master key is required to be erased.

An example of mutual authentication in a typical card reader will be described below with reference to FIG. 4 through FIG. 6.

Figure 4:
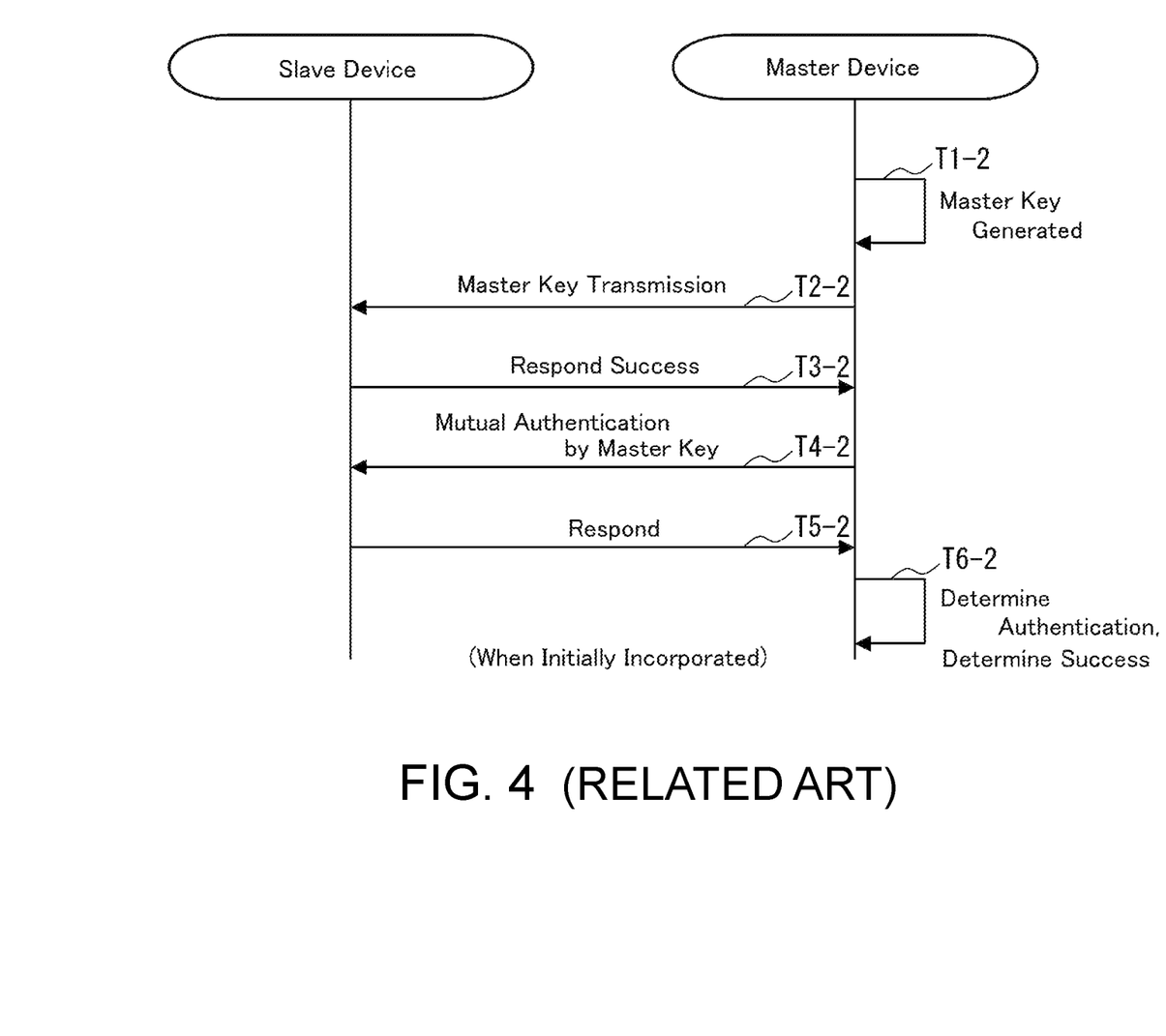
FIG. 4 is a sequence chart showing a conventional mutual authentication system at a time of initial incorporation.

FIG. 4 shows an authentication sequence in a case that a master device and a slave device are initially activated (first time) to perform mutual authentication during manufacture and inspection in a factory or the like. The master device and the slave device respectively store a common temporary key. First, in the master device, a master key is generated (timing T1-2). In this example, the master key is unique for each card reader 1 (device unique). Further, the master device transmits the master key by using the temporary key and introduces into the slave device (timing T2-2). The slave device performs a response of success (timing T3-2). After that, the master device performs mutual authentication by using the master key (timing T4-2). In response, the slave device responds (timing T5-2). The master device confirms a content of the response from the slave device and determines whether the mutual authentication has succeeded or failed (timing T6-2).

Figure 5:
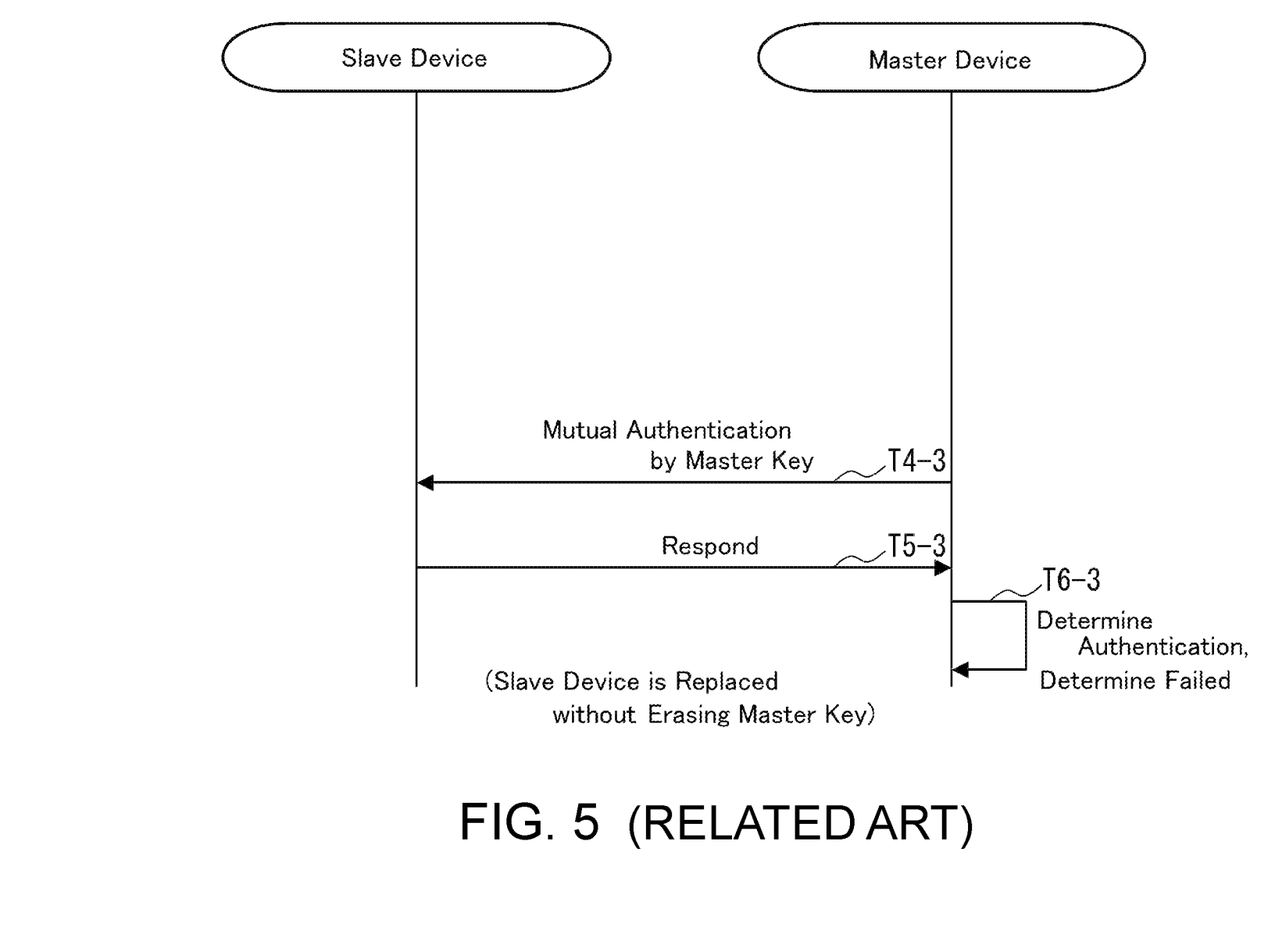
FIG. 5 is a sequence chart showing a case that a slave device is replaced (without erasing) in a conventional mutual authentication system.

FIG. 5 shows a sequence in a case, as an example, that mutual authentication is performed without erasing the master key when the slave device is replaced.

In a typical card reader, the master key is device unique. Therefore, when mutual authentication by using the master key is performed from the master device (timing T4-3), the master device judges a response from the slave device (timing T5-3) and determines that the mutual authentication has failed (timing T6-3). This is because that, when the slave device is replaced, a master key after replacement is not stored in the slave device and thus, the master device determines that "the master key is different".

In addition, even in a case the slave device is replaced to a used slave device in which a master key has already been stored or, even in a case replaced to an illegal slave device, the mutual authentication has failed and its use is prohibited.

Figure 6:
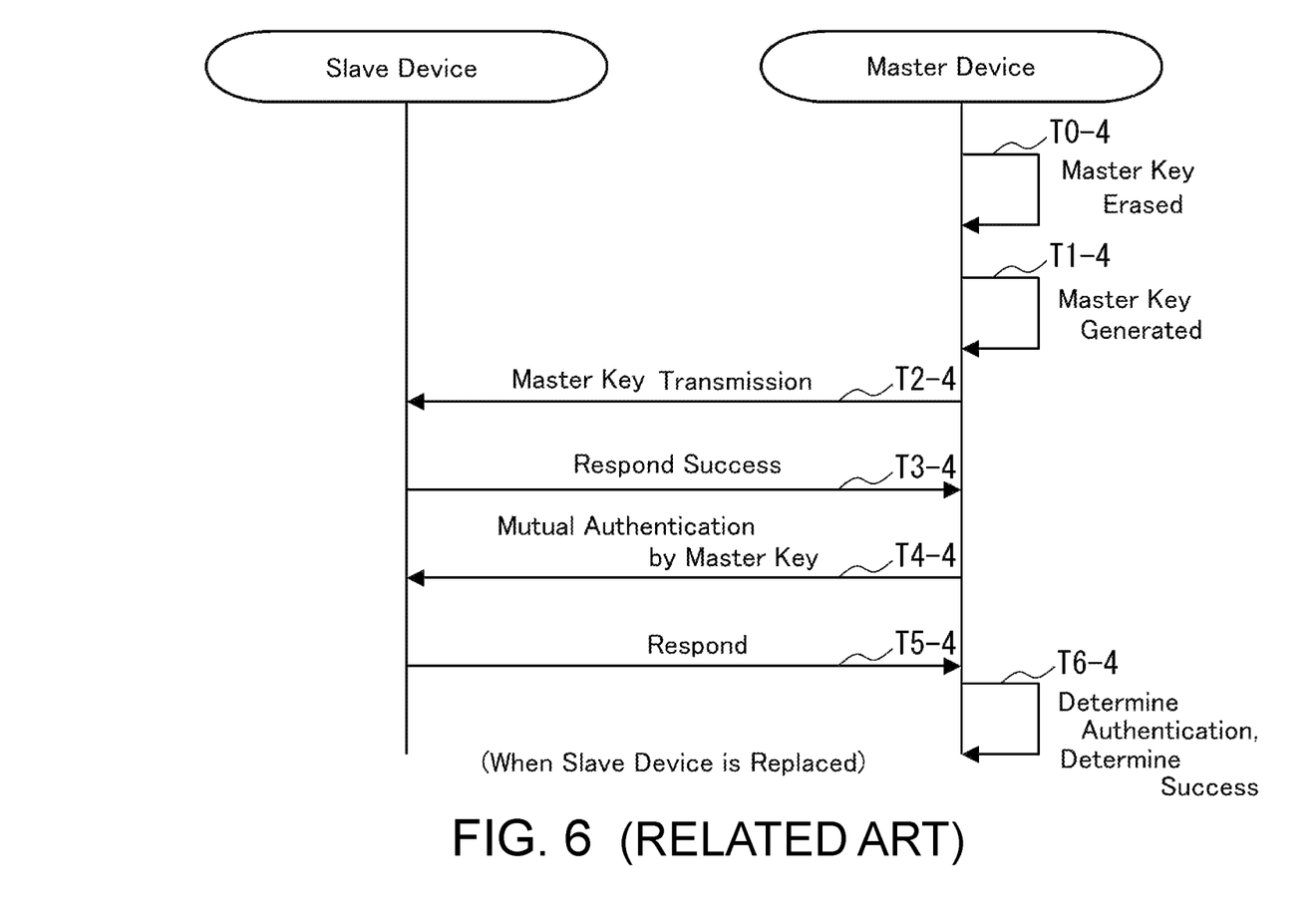
FIG. 6 is a sequence chart showing a case that a slave device is replaced (master key is erased) in a conventional mutual authentication system.

FIG. 6 shows a sequence when the slave device is replaced in a state after first time mutual authentication shown in FIG. 4 has been performed in a typical card reader. As described above, in a typical card reader, the master key is unique for each card reader and thus, a procedure for initially erasing the master key is required before mutual authentication (timing T0-4). After that, mutual authentication is performed in a procedure similarly to that shown in FIG. 4 (timings T1-4 through T6-4).

As described above, when a slave device which is a security product coping with encryption function is replaced, the master key is required to be once erased for mutual authentication. When the master key is to be erased as described above, there is concern on security and thus, for example, the operation is required to perform under a safe environment (security room or the like).

On the other hand, the card reader 1 in accordance with an embodiment of the present invention is a mutual authentication system including the master device 10 and the slave device 20 which are authenticated with each other. The master device 10 is provided with the storage part 12 which stores the temporary key 310 that is key data used temporarily and the master key 300 that is key data used for authentication, the key confirmation unit 100 configured to inquire whether the slave device 20 stores the master key 300 similar to that stored in the storage part 12, the key introduction unit 110 configured so that, in a case that the slave device 20 does not store the master key 300 in response to the inquiry of the key confirmation unit 100, the master key 300 is encrypted by using the temporary key 310 and transmitted to the slave device 20, and the main authentication unit 120 which is mutually authenticated with the slave device 20 by using the master key 300 transmitted from the key introduction unit 110. Further, the slave device 20 is provided with the storage part 22 which stores the temporary key 310, the key confirmation response unit 200 configured to confirm whether the master key 300 has already been stored in the storage part 22 in response to the inquiry from the master device 10 and respond, the key storage unit 210 configured to decrypt the master key 300 transmitted from the master device 10 for the response of the key confirmation response unit 200 with the temporary key 310 and store in the storage part 22, and the sub-authentication unit 220 configured to mutually authenticate with the master device 10 by using the master key 300 stored in the storage part 22 by the key storage unit 210.

In the card reader 1 structured as described above, the master key 300 is not changed, and presence or absence of the master key 300 in the slave device 20 after replacement is confirmed and, when the master key 300 is not present, the master key 300 is introduced by using the temporary key 310.

Therefore, the master device 10 is capable of introducing the master key 300 to the slave device 20 without erasing the master key 300 and the mutual authentication can be succeeded. As a result, the slave device 20 such as an encryption magnetic head requiring high security can be replaced safely, and the security can be enhanced in comparison with the conventional technique without securing a condition or a place having high security.

Further, as described above, erasure of the master key has concern on security and thus, it is required to perform under a safe environment. In order to construct the safe environment, labor and costs are required.

The card reader 1 in this embodiment is capable of performing mutual authentication in a high security state even when there is no safe environment and thus, labor and costs can be reduced. In addition, a service person is capable of directly replacing and operating an encryption magnetic head or the like in a repair spot for an ATM or the like and thus, labor and costs of maintenance can be also reduced.

The card reader 1 in accordance with an embodiment of the present invention further includes the key generation unit 130 configured so that, when the master device 10 is initially started, the key generation unit 130 generates the master key 300 by using a random number and stores in the storage part 12.

According to this configuration, when the master device 10 is initially started at a time of shipment from a factory or the like, the key data which are device unique can be generated safely.

In the card reader 1 in accordance with an embodiment of the present invention, the key confirmation unit 100 inquires whether the slave device 20 stores the master key 300 at a specific timing.

According to this configuration, the master device 10 inquires whether the slave device 20 stores the master key 300 at a specific timing, for example, when the power source is turned on. As a result, it can be detected that an illegal head or the like has been attached.

In the card reader 1 in accordance with an embodiment of the present invention, the main authentication unit 120 and the sub-authentication unit 220 are mutually authenticated by using a symmetric key encryption system.

According to this configuration, an asymmetric key encryption such as RSA is not used and authentication is performed only by a symmetric key encryption such as AES and thus, processing speed relating to mutual authentication can be improved. As a result, mutual authentication can be realized even when an inexpensive CPU is used.

Other Embodiments

In the embodiment described above, as an example of a mutual authentication system, the structure using the card reader 1 which includes the master device 10 and the slave device 20 is described.

However, a mutual authentication system in accordance with another embodiment of the present invention may be configured as a mutual authentication system in which a card reader and a host apparatus are authenticated with each other. In addition, in the card reader, the number of the slave device 20 is not limited to one and a plurality of slave devices 20 may be provided. In this case, it may be structured that an encryption IC block is used as the slave device 20. In addition, a mutual authentication system including a security product other than a card reader which performs mutual authentication may be structured. The security product may include, for example, a card printer, a card issue device, other card related devices, a main body of an ATM or the like, etc. Further, a mutual authentication system may be structured which includes various information processing devices, for example, a portable terminal such as a smart phone, a PC (Personal Computer), a home electric appliance, and an automobile as a master device or a slave device.

According to this structure, mutual authentication corresponding to various structures can be performed.

Further, in the embodiment described above, an example is described in which the master key 300 is generated in the master device 10. However, the master key 300 may be stored in the storage part 12 by introducing through transmission from a host apparatus or separately introducing key data which are device unique during manufacture.

According to this configuration, the master key 300 stored for each device can be controlled and the like.

Further, in the embodiment described above, an example using a common key (symmetric key) encryption method of AES for authentication is described. However, an encryption method such as Triple DES may be used. Further, public key encryption may be used according to calculation performance of the control parts 11 and 21.

According to this configuration, an appropriate mutual authentication system matched with a structure of a card reader, requirements of the standard, or the like can be provided.

Although the present invention has been shown and described with reference to a specific embodiment, various changes and modifications will be apparent to those skilled in the art from the teachings herein.

What is claimed is:

1. A mutual authentication system comprising a master device and a slave device which are authenticated with each other;

wherein the master device comprises:
a storage part which stores a temporary key that is key data temporarily used and a master key that is key data used for authentication;
a key confirmation unit configured to inquire whether the slave device stores the master key;
a key introduction unit configured so that, in response to an inquiry of the key confirmation unit, when the slave device does not store the master key, the key introduction unit encrypts the master key by using the temporary key and transmits to the slave device; and
a main authentication unit configured to mutually authenticate with the slave device by using the master key transmitted from the key introduction unit; and wherein the slave device comprises:
a storage part which stores the temporary key;
a key confirmation response unit configured to confirm whether the master key has already been stored in the storage part for an inquiry from the master device and respond;
a key storage unit configured to decrypt the master key transmitted from the master device by using the temporary key for a response of the key confirmation response unit and store in the storage part; and
a sub-authentication unit configured to mutually authenticate with the master device by using the master key which is stored in the storage part by the key storage unit.

2. The mutual authentication system according to claim 1, wherein the master device further comprises a key generation unit configured to generate the master key by using a random number when initially started and store in the storage part.

3. The mutual authentication system according to claim 2, wherein the key confirmation unit inquires whether the slave device stores the master key at a specific timing.

4. The mutual authentication system according to claim 3, wherein mutual authentication by the main authentication unit and the sub-authentication unit use a symmetric key encryption system.

5. The mutual authentication system according to claim 2, wherein mutual authentication by the main authentication unit and the sub-authentication unit use a symmetric key encryption system.

6. The mutual authentication system according to claim 1, wherein the key confirmation unit inquires whether the slave device stores the master key at a specific timing.

7. The mutual authentication system according to claim 6, wherein mutual authentication by the main authentication unit and the sub-authentication unit use a symmetric key encryption system.

8. The mutual authentication system according to claim 1, wherein mutual authentication by the main authentication unit and the sub-authentication unit use a symmetric key encryption system.

9. A mutual authentication method executed by a mutual authentication system comprising a master device and a slave device which are authenticated with each other, the master device comprising a storage part which stores a temporary key that is key data temporarily used and a master key that is key data used for authentication, and the slave device comprising a storage part storing the temporary key, the mutual authentication method comprising:

inquiring by the master device whether the slave device stores the master key;

confirming by the slave device whether the master key has already been stored in the storage part and responding for an inquiry from the master device;

encrypting by the master device the master key by using the temporary key in a case that, as a response to the inquiry, the slave device does not store the master key, and transmitting to the slave device;

decrypting by the slave device the master key transmitted from the master device for the response by using the temporary key and storing in the storage part; and mutually authenticating between the master device and the slave device by using the master key.

* * * * *